(No Model.) 7 Sheets—Sheet 3.
A. J. NEAL.
FENCE MACHINE.
No. 374,550. Patented Dec. 6, 1887.
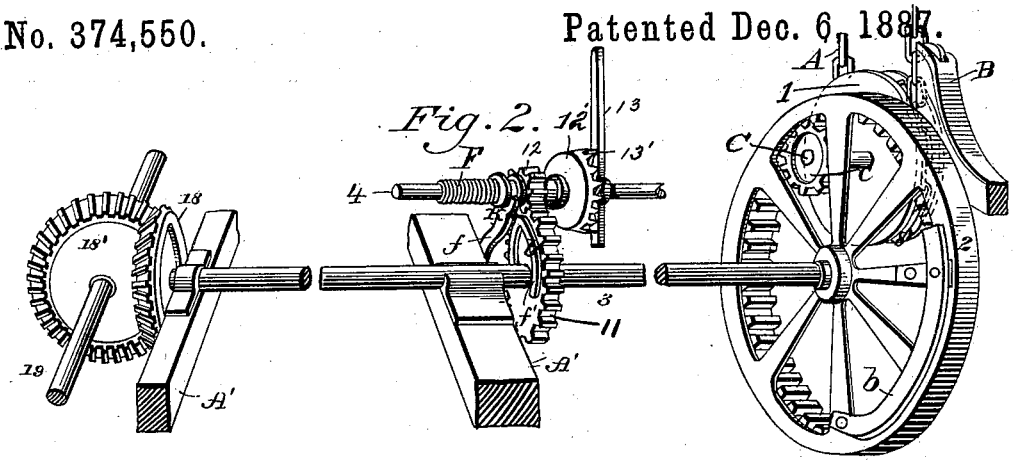
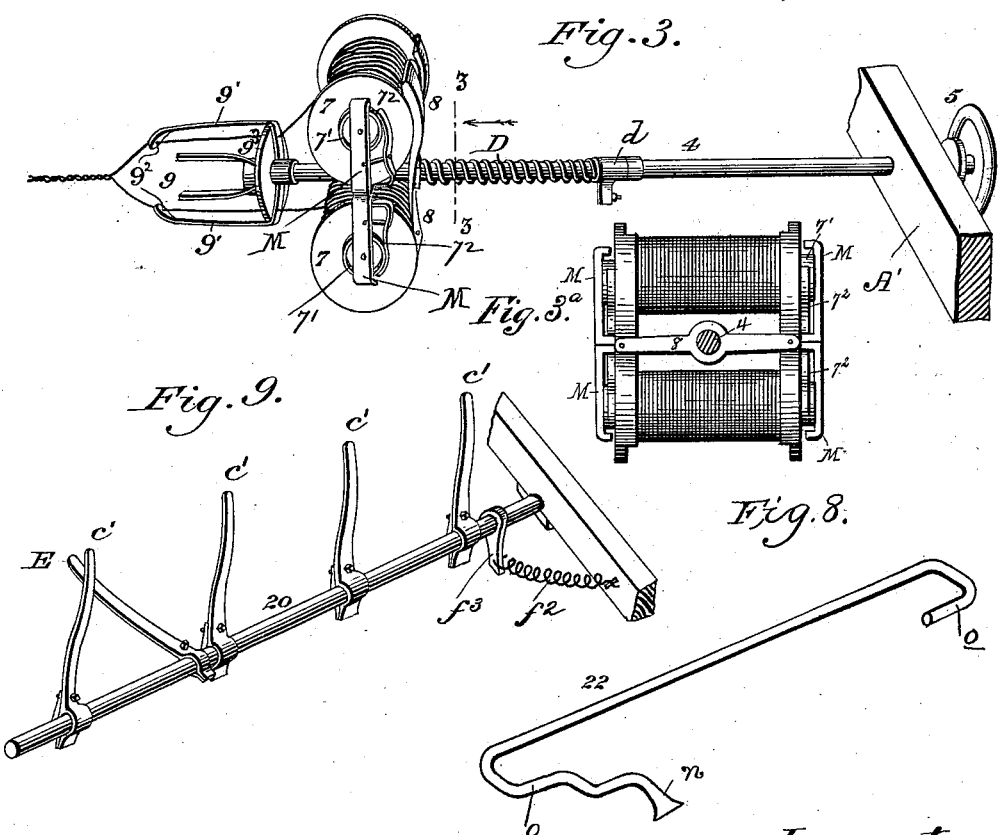
Witnesses:
H. J. Davis
J. M. Slade
Inventor:
Andrew Jackson Neal
By R. S. & A. Lacey
Attys (No Model.) 7 Sheets—Sheet 4.
A. J. NEAL.
FENCE MACHINE.
No. 374,550. Patented Dec. 6, 1887.
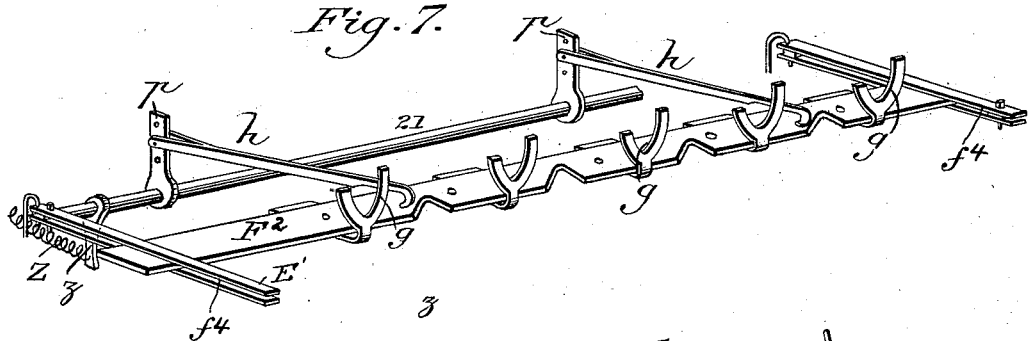
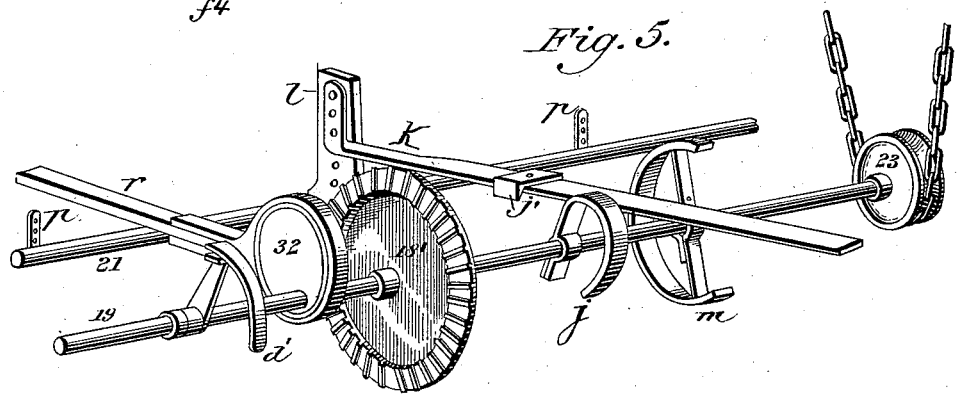
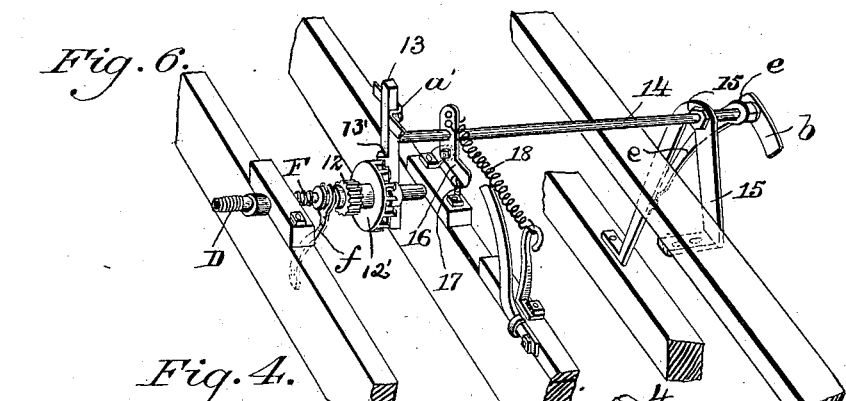
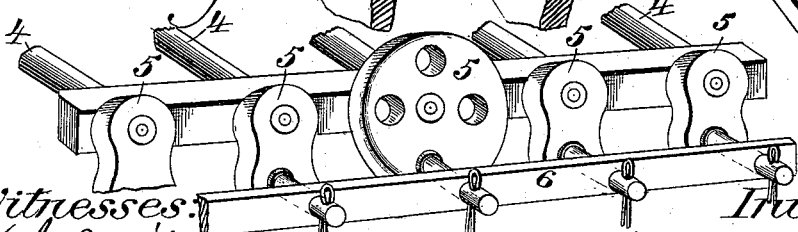
Witnesses:
H. J. Davis
F. M. Slade
Inventor
Andrew Jackson Neal
R. S. & A. P. Lacey
Attys (No Model.)
A. J. NEAL.
FENCE MACHINE.
No. 374,550. Patented Dec. 6, 1887.
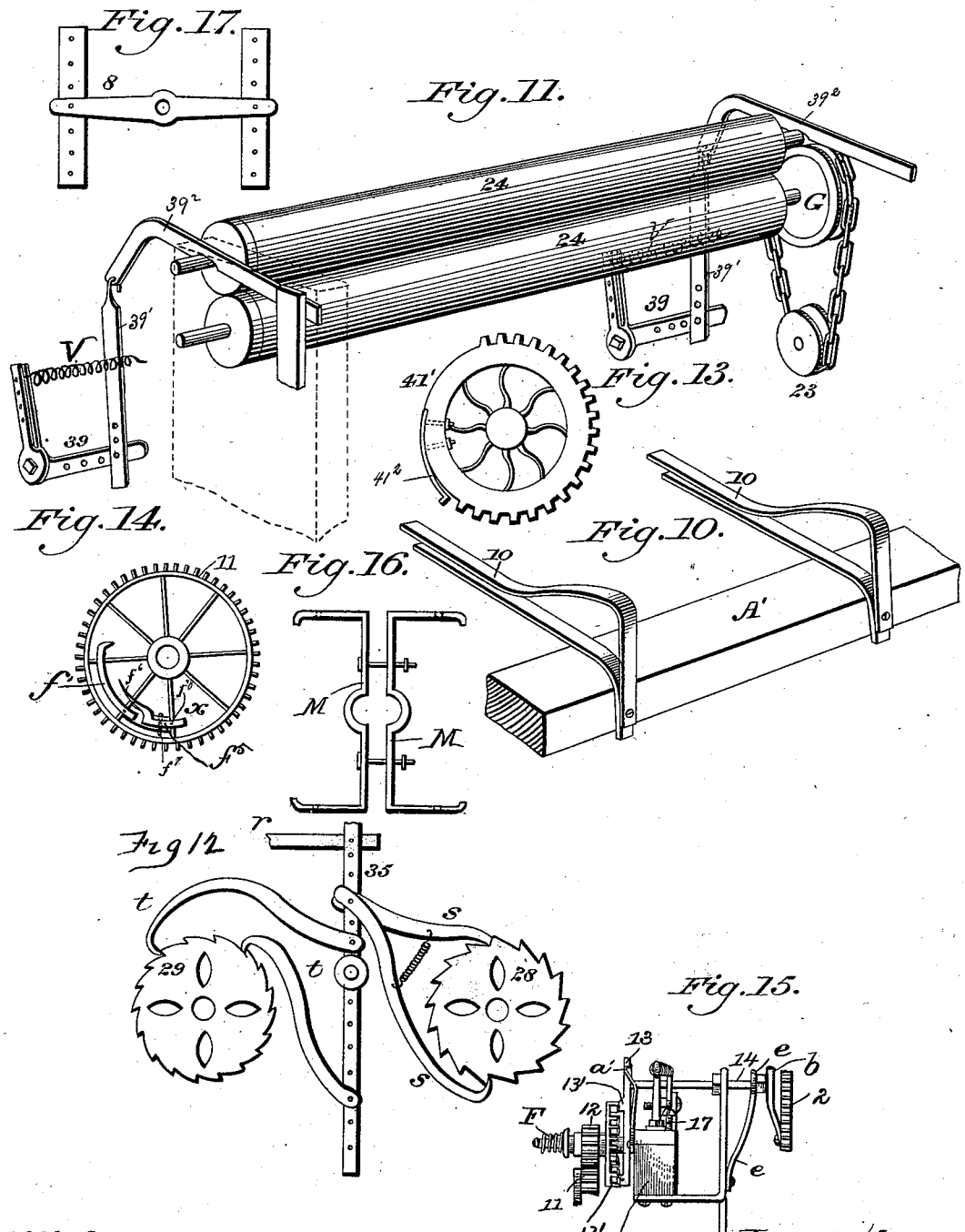
Witnesses:
H. J. Davis
F. M. Slade
Inventor:
Andrew Jackson Neal,
R. S. & A. P. Lacey
Atty

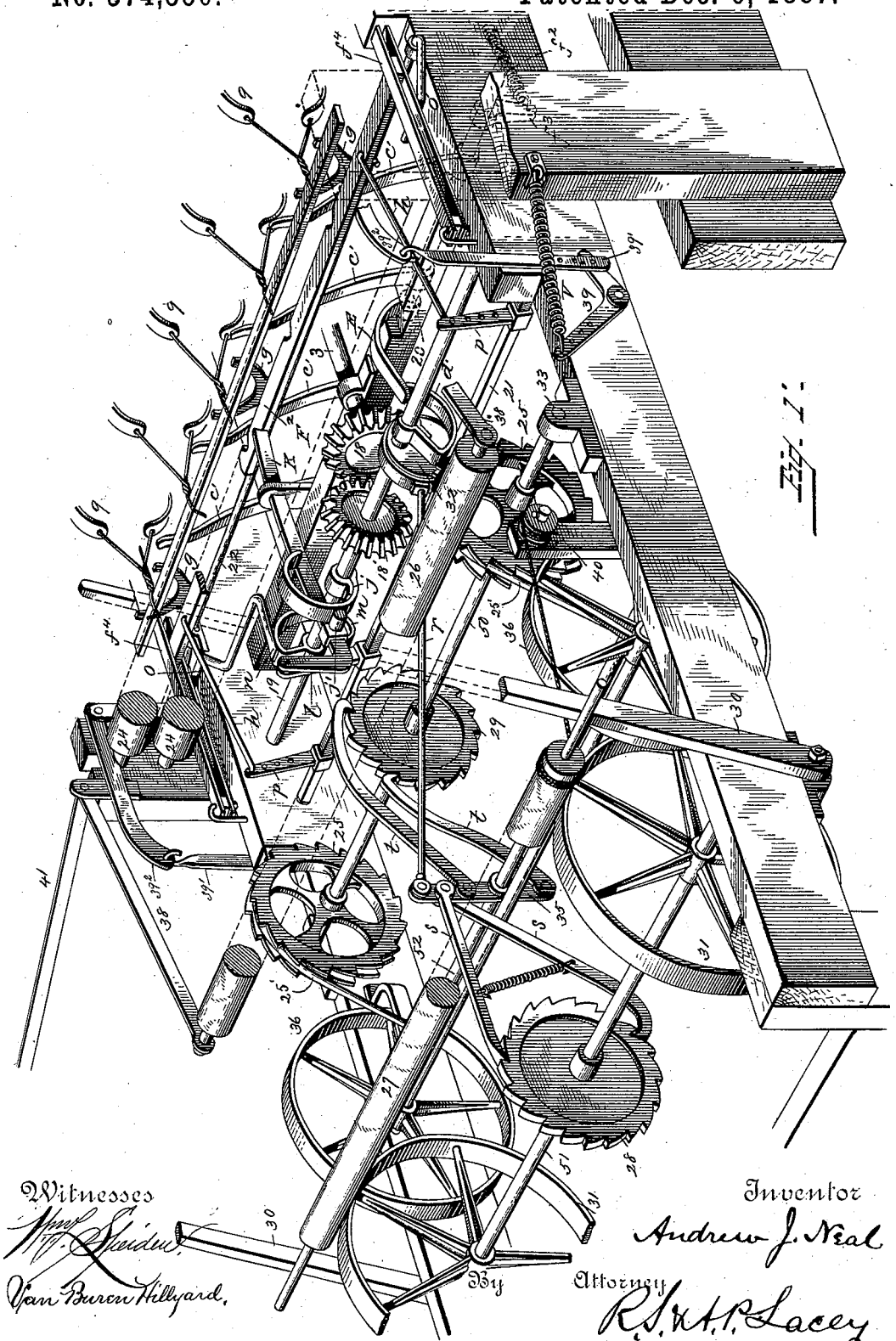

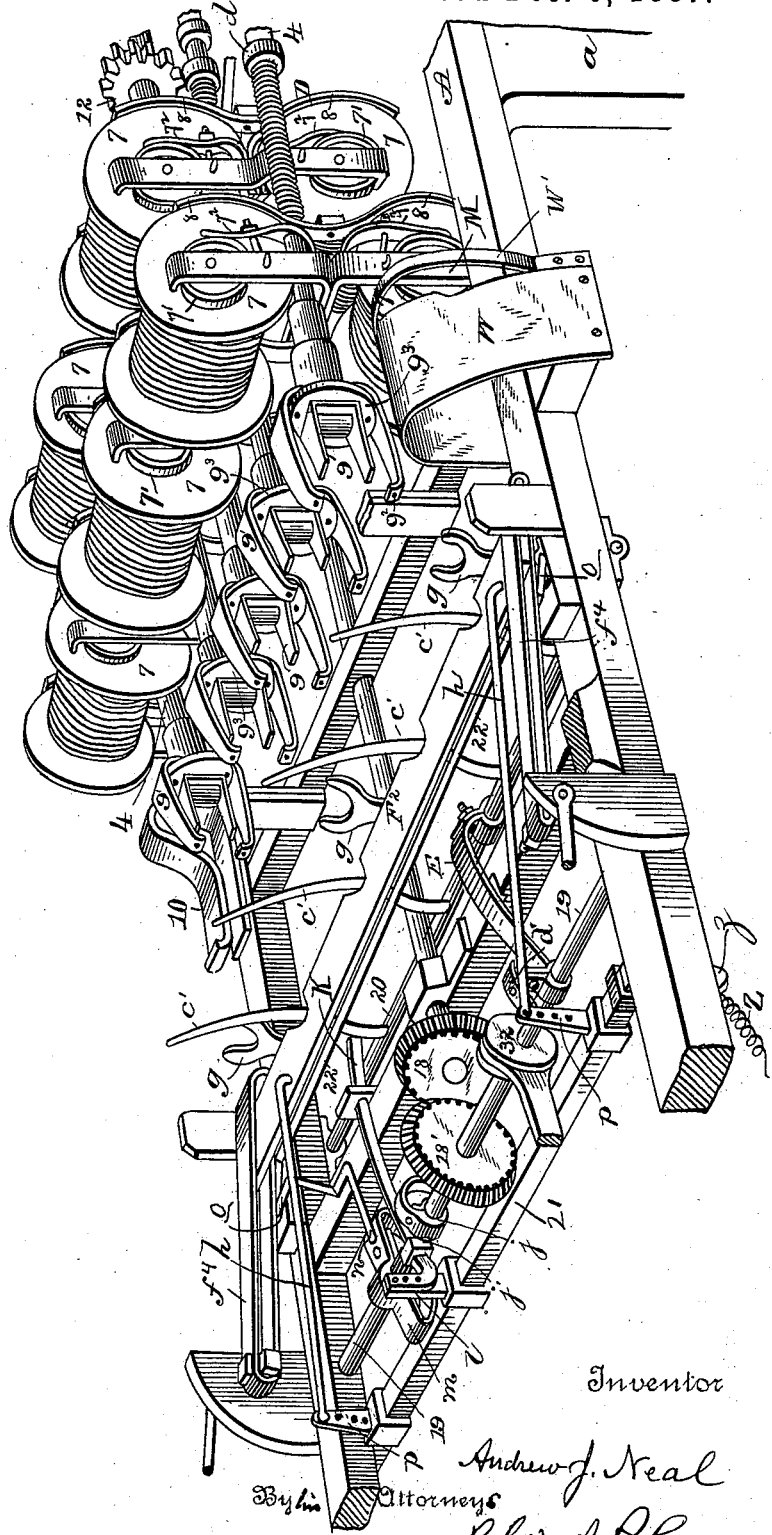

(No Model.) 7 Sheets—Sheet 7.

A. J. NEAL.
FENCE MACHINE.

No. 374,550. Patented Dec. 6, 1887.

Witnesses
Wm. J. Tanner
S. Specht

Inventor
Andrew J. Neal
By his Attorneys
R.S. & A. Lacey

United States Patent Office.

ANDREW JACKSON NEAL, OF MILES, ASSIGNOR OF SEVEN-SIXTEENTHS TO ALBERT LLOYD BARTHOLOMEW, OF PRESTON, AND HARRIS THOMPSON MILLIKEN, OF MARION, IOWA.

FENCE-MACHINE.

SPECIFICATION forming part of Letters Patent No. 374,550, dated December 6, 1887.

Application filed August 19, 1886. Serial No. 211,329. (No model.)

*To all whom it may concern:*

Be it known that I, ANDREW JACKSON NEAL, a citizen of the United States, residing at Miles, in the county of Jackson and State of Iowa, have invented a new and useful Improvement in Machines for Constructing Picket-and-Wire Fences, of which the following is a specification.

My invention relates to machines for constructing wire fences in which any number of wires may be used—from four to ten—and the distance between the pickets adjusted from two to six inches.

The improvement consists in the novel construction and combination of parts, which will be more fully hereinafter set forth and claimed, and shown in the accompanying drawings, in which—

Figure 19:
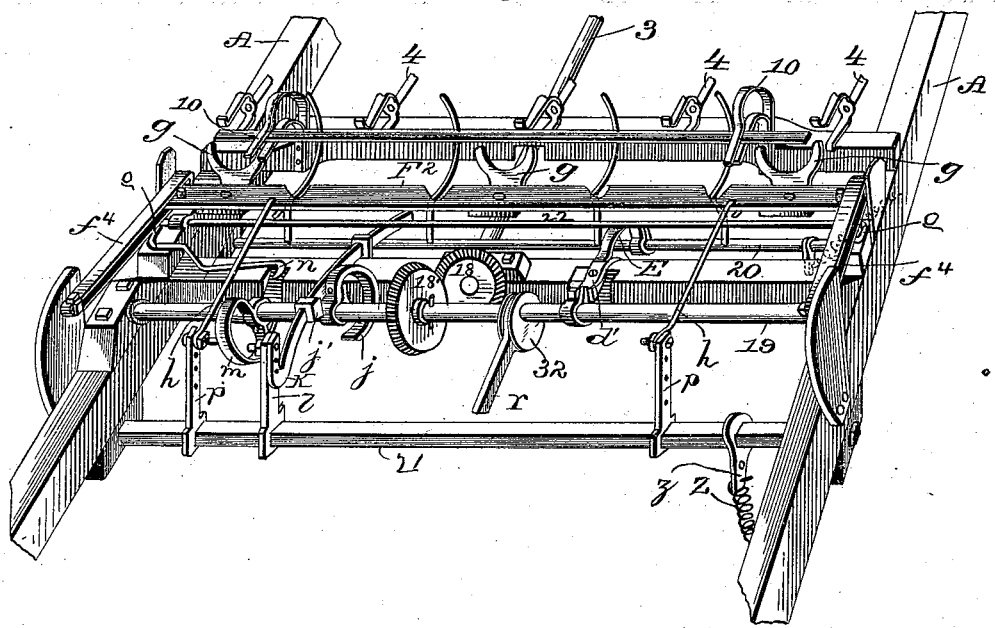
Figure 20:
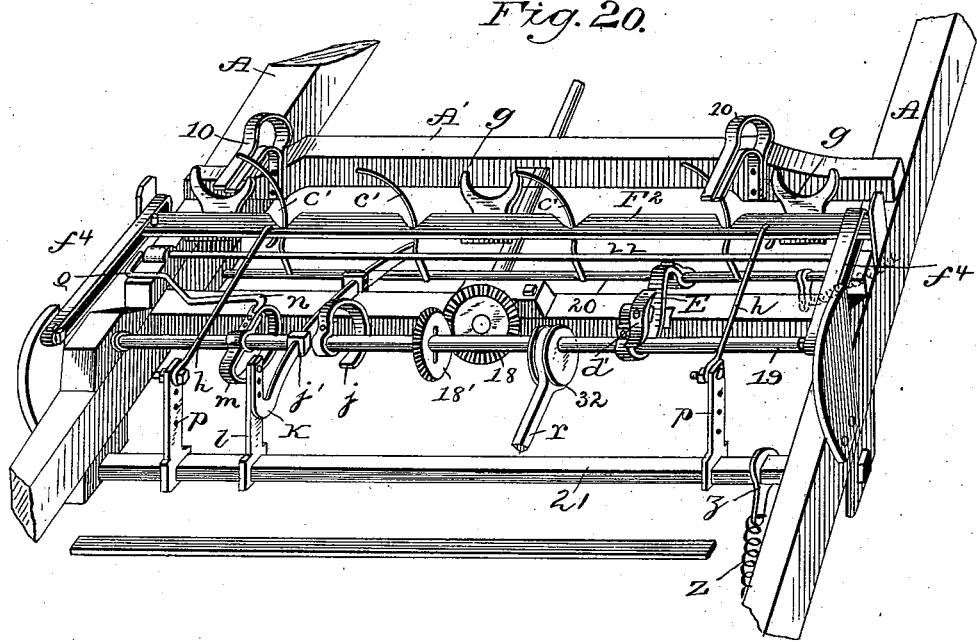

Figure 1 is a perspective view, parts being broken away, of one half of a machine of my construction embodying my invention. Fig. 1' is a perspective view, parts being broken away, of the other half of the machine; Fig. 2, a perspective detail view of the main driving-shaft, on an enlarged scale, showing the mechanism for applying power thereto and for transmitting power from the main shaft to the spool-carrying shafts; Fig. 3, a perspective detail view of a spool-shaft; Fig. 3ᵃ, a section of the spool-shaft on the line Z Z of Fig. 3, looking in the direction of the arrow; Fig. 4, a perspective detail view of the rear ends of the spool-shafts and the devices for connecting and operating them synchronously and in the same direction; Fig. 5, a perspective detail view of the transverse shaft and the several cams mounted thereon, which operate the fence feeding and rolling devices and the picket-injector; Fig. 6, a perspective detail view of the mechanism for throwing the spool or twisting shafts in and out of gear. Fig. 7 is a perspective view of the fence-feeding mechanism; Fig. 8, an isolated perspective view of the lifting-bar for elevating the fence-feeding bar in the rear of the last picket woven in previous to its forward movement; Fig. 9, a perspective view of the picket-ejector for throwing the picket out of the picket-holder; Fig. 10, a perspective view of the picket-guides; Fig. 11, a perspective detail view of the devices or rollers for pressing the wires upon the pickets; Fig. 12, a detail side view of the mechanism for rolling the fence up into a bundle as soon as it is completed; Fig. 13, a side view of a modified form of the gear-wheel for regulating the number of twists of wire between the pickets; Fig. 14, a side view of the gear-wheel for regulating the number of twists of the wire between the pickets; Fig. 15, a detail side view of the mechanism for throwing the twisting or spool shafts into and out of gear; Fig. 16, an isolated side view of the spool-supporting clamp; Fig. 17, a rear view of the brake for regulating the tension of the wires; Fig. 18, a perspective, with detail parts broken away, of the spool-shafts, the ejector, and the feeding-bar, on an enlarged scale; Fig. 19, a detail perspective view showing the relative position of the parts previous to the operation of the ejector and just after the insertion of a picket in the picket-holder; and Fig. 20, a view similar to Fig. 19, but showing a different position of the parts, in that the ejector has operated and the feeding-bar is just about to be elevated.

Similar letters and numbers refer to similar parts throughout the several views.

The frame of the machine, which may be of any desired length, width, and height suitable to the size of the machine, is composed of side sills, A, cross-bars A', and uprights or supports *a*.

The twisting mechanism is located at one end of the frame, the fence-rolling devices at the opposite end of the frame, and the feeding, holding, and wire-pressing mechanism and appliances are located intermediate the ends of the frame.

1 is the grooved wheel or band-pulley, mounted upon the shaft C, suitably journaled in the head-block B, and receiving its motion from a suitable source of power by the chain or band A', passing over the wheel or pulley 1.

2 is the drive-wheel on main shaft 3, and receiving its motion from shaft C by the pinion *c*, keyed to the shaft C and meshing with the teeth of the wheel 2.

4 represents spool or twisting shafts, provided with the cranks 5 at their outer ends, which are connected by the bar 6.

7 represents spools for wire, having flanged ends 7', against which tension-springs $7^2$ bear for preventing the too free movement of the spools about their axis when paying out the wire. These spools are mounted in ⌊_⌋-shaped brackets placed back to back and clamped on shafts 4 by suitable means.

8 is the double tension-clamp, steel and wood faced with leather or rubber, held to place against the spools by spiral springs D, mounted on shafts 4 and located between collars $d$ and said tension-clamp for forcing it with a yielding pressure against the spools.

9 represents picket-holders secured to a cast hub, $9^3$, flat on the inside, and provided with two prong-extensions, 9', having an opening, $9^2$, in each for wire to run through from the spools. The base of hub has collars which are fitted to the end of the twister-shaft. The picket-holders 9 are independent of the prong-extensions 9' and can readily be replaced at a small expenditure in case of breakage. The picket-holders prevent the picket bearing down on or crowding the wire which is located in the space between the said picket-holder and the prong-extensions 9'.

10 represents picket-guides, made of iron, of sufficient length to support the pickets and direct them in their progressive movement while the wire is twisted about them.

11 is the spur-wheel on the main shaft 3 to drive shaft 4.

12 is the clutch-pinion on the center shaft of the spool-twisting shafts, which meshes with the spur-wheel 11. This pinion has a clutch, 12', cast on one side of or with it, and is loose on the shaft, and is adapted to mesh with a corresponding clutch, 13', keyed on the shaft, at the proper time, so that the pinion and shaft will revolve together.

13 is the time-needle, integral with and forming an extension of the clutch 13', keyed to the center twister-shaft and prevented from falling back or any retrograde movement while the machine is running with the clutch-pinion unlocked by arched spring $a'$, having one end screwed to a cross-bar of the frame, and having a shoulder on the end that sets against the time-needle, holding the needle in place until engaged by the clutch-pinion.

14 is the time-bar, mounted at one end in the bracket 15 and at its opposite end in the yielding bearing 16, which is a bell-crank lever pivoted at the elbow and having its horizontal branch resting upon and limited in its downward movement by the adjustable stop or set-screw 17, and having its vertical branch connected by spring 18 with a bracket bolted to the cross-bar of the frame. The time-bar has a longitudinal movement in its bearings and is retracted and held in a retracted position by the spring $e$, and is projected within the path of the time-needle by the cam $b$ on the drive-wheel 2 to engage with the time-needle and return it to a normal position against the shoulder of the spring $a'$ when carried too far forward at the time of the unlocking of the clutch-pinion from the twister-shaft. The clutch-pinion 12 12' is adapted to slide longitudinally upon the center twister-shaft to and from the time-needle clutch 13 13', and is carried up to and held in engagement with the needle clutch by spring F, and is disengaged from the needle-clutch at the proper time by the cam $f'$, secured to the side of the wheel 11, bearing against the shipper-lever $f$, secured at one end of the cross-bar of the frame, and having its opposite end engaging with the clutch-pinion.

19 is the cam-shaft, with pulley 23 on one end to drive the rollers 24.

To the left of the bevel-wheel 18' is cam 32 for operating the wheels that draw out and roll up the web. Close to cam 32 on the left is a half-cam, $d'$, which strikes dog E and throws the fingers or ejectors $c'$ on shaft 20 back, so that picket may be inserted in the picket-holder. When cam $d'$ leaves dog E, spiral spring $f^2$, interposed between the frame and the arm $f^3$, keyed to said shaft 20, throws fingers or ejectors $c'$ forward and carries the picket forward between the guides. About two inches to the right of bevel-wheel 18', on cam-shaft 19, is cam $j$, which strikes the dog $j'$ on lever K, bolted to arm $l$, and as the cam presses against the dog it throws back the arm and turns shaft 21, upon which the arms $pp$, connected with the feeding-bar $F^2$ by hook-bars $hh$, are mounted. The forked fingers $g$ extend upward from the bar $F^2$ and are drawn to place behind the picket by a spiral spring, $z$, interposed between the frame and the arm Z, projected from the shaft 21. The half-cam $m$, keyed to shaft 19, strikes the arm $n$, projected from the lifting-bar 22, and tilts the lifting-bar, which is located directly under the feeding-bar $F^2$, in its bearings, which raises the points $oo$ and elevates the bar $F^2$ and carries the fingers $g$ thereof behind the pickets. Now the cam $j$ strikes the dog $j'$ and throws back the arm $l$ and draws the picket and wire out as the wire is twisted.

20 is the finger or ejector shaft, to which the dog E and ejectors $c'$ are clamped. The dog extends in a different direction to the ejectors and is adapted to be struck by cam $d'$, for the purpose previously mentioned. The end of the lever K is turned up at right angles and is adjustably connected with the arm $l$ for regulating the distance traversed by the feeding-bar and the consequent amount of the feed of the fence. The feeding-bar $F^2$ slides between two small bars of iron, $f^4$, at each end. These bars are pivoted at one end of machine, the other end being free to move vertically to allow $F^2$ to rise and fall.

22 is the lifting-bar, having its ends bent to form the lifting-points $oo$, which strike on the under side of the feeding-bar $F^2$ at the proper time and elevate it.

23 is the pulley, connected by chain with a pulley, G, on one of the top rollers, 24. Between rollers 24 the web is drawn under roller 26, journaled in the ends of rods 38, which holds it to the wheels 25 25, and is by them carried back to the roller 27, upon which it is rolled by wheels 31.

30 represents upright posts slightly inclined to a vertical line, pivoted at their lower ends to the sides of the frame, and adjustably connected at their upper ends with brace-bars 41. The journals of the roller 27 rest on these posts, which hold the roller against the tension of the fence. By this arrangement the roller can rise and accommodate itself to the bulk of fence wound thereon.

Wheels 25 25 are about two feet in diameter and about two inches wide at outer rim, with grooves one and one-half inch wide (more or less) in the center of the outer rim one-half inch below the ratchets, in which grooves a spring, 25', works to throw off the web from the ratchets.

The roller 26, journaled on the outer ends of the rods 38, which are pivoted at their inner ends to the frame, rests upon the wheels 25 and holds the fence in contact with their teeth against accidental displacement.

Wheels 25 are operated by cam 32, connecting-rods $r$, pawls $tt$, and the ratchet-wheel 29, keyed to shaft 50, upon which the wheels 25 are mounted, and the web is rolled up on the rollers by the same connecting-rod, $r$, and the pawls $ss$, operating the ratchet-wheel 28, keyed to shaft 51. The two sets of pawls $ss$ and $tt$ are adjustably connected with the vibrating bar 35, rocked about its support by cam 32 and rod $r$. Wheels 36 run loosely on the shaft 52, and the web rests upon them while being rolled up by wheels 31. Two flat bars of iron, 41 41, are attached at one end to the upright posts 30 30, and at the other end to the supports of the rollers 24.

The device or bell-crank levers 39 39 are for regulating the pressure of the rollers 24 upon the web as it passes between them, the pressure being regulated by the spiral spring V, which is adjustably interposed between one end of each bell-crank lever and the frame, the rod 39', adjustably connected at its lower end with the other end of the bell-crank lever, and the horizontal levers $39^2$, bearing upon the journals of the upper roller, 24, connected at one end with rods 39' and at the other end with the frame.

40 is a device for measuring the web, being a spool upon which is rolled fine wire or twine or a tape-measure. Attach the free end to the first picket, and as the web is rolled up on 27 it unrolls just the number of rods, feet, &c., of the measure there is rolled up of fence. The cam $f'$ on the spool-wheel 11, Fig. 14, and extension $f^5$, which unlocks the clutch-pinion 12 by bearing against the shipper-lever $f$, permitting the shafts 4 to remain stationary while the pickets are being inserted in picket-holder 9, also regulate the number of twists in the wire between the pickets. Lengthening the cam gives fewer twists of the wire, in that the clutch-pinion is held unlocked from the center twister-shaft during a longer period of the operation of the machine. The part $f'$, with the part $f^5$, constitute and form but one continuous cam, and the part $f^5$ has a portion, $f^6$, which overlaps the joint between $f'$ and $f^5$, and the surfaces of $f'$, $f^5$, and $f^6$ are in the same plane. The part $f^5$, being adjustably connected with the wheel by the set-screw $f^7$, entering one of a series of openings, $f^8$, in the said part $f^5$, can be moved in or out, according as it is desired to shorten or lengthen the cam $f'$. The same result can be obtained by using the mutilated gear-wheel 41' instead of the gear-wheel 11, the shipper-lever $f$, and the clutch, because the twister-shafts will remain at rest while that part of the wheel devoid of teeth is moving past the pinion, which in this case will be keyed to the center twister-shaft. The mutilated gear-wheel will have more or less teeth, according to the number of twists it is desired to give the wires between the pickets. It will be understood that if it is required to vary the number of twists the mutilated gear-wheel must be replaced by another having a greater or less number of teeth to meet the exigency. The spring-tooth $41^2$ is a common and well-known expedient to permit the wheel to readily come in mesh with the clutch-pinion. The picket-rest W and guide W', arranged to one side of the machine, support the end of the picket previous to slipping it in position in the holders 9 and give direction thereto. The rest W is made of sheet metal curved to about the form shown, and having its top on a line with the space between the arms of the picket-holders 9 and the guides 10. The rest W' is made of a bar curved approximately to the form of the rest, but to a higher level, so that the picket resting upon W will strike its edge and be limited in its movement.

In practice motion is imparted to the machine by band or chain A', wheel 1, shaft C, pinion $c$, drive-wheel 2, main shaft 3, bevel-pinions 18 and 18', and the cam shaft 19. When the cam shaft has moved to such a position that the ejectors are thrown back to their utmost limit, during which time the twister-shafts are at rest, the picket is slipped into the picket-holders from one side of the machine by an endwise thrust. A further movement of the machine disengages cam $d$ from the dog E, and the ejector-fingers are thrown forward, carrying the picket out of the holders and into the guides 10, where they are held during the twisting of the wires. Now the cam $j$ begins to engage with the dog $j'$, and through lever K, arm $l$, shaft 21, arms $p$, and rods $h$ begins to move the feeding-bar forward. Simultaneously with this operation the cam $m$ strikes the arm $n$ of the lifting-bar and tilts it, and the points $oo$, coming in contact with the feeding-bar, elevate the same till the fingers $g$ come up behind the picket. The cam 32 at this stage of the operation actuates the rod $r$ and the shafts 50 and 51 through the mechanism previously described, so as to draw the fence forward between the rollers 24, between which the wire is pressed upon the pickets and rolls the fence up on the roller 27. The clutch-pinion becoming keyed to the center twister-shaft, simultaneously turns it and the other twister-shafts by means of the cranks 5 and the bar 6. While the wires are being twisted about the pickets, the feeding mechanism drawing forward the fence and near the end of the action of the twisting mechanism, the cam $d$ engages with the dog E and returns the ejectors to their first position, and the cam $m$ and arm $n$ are disengaged, which causes a lowering of the feeding-bar, and the cam $j$ and dog $j'$ also becoming disengaged, the feeding-bar is returned by spring $z$ to its original position, the clutch-pinion is unlocked from the center twisting-shaft, and the machine is in readiness for receiving another picket, which is twisted in the manner just described.

Having thus described my invention, what I claim, and desire to secure by Letters Patent, is—

1. The combination, with the frame, the main shaft, the twisting-shafts, means for operating the twisting-shafts from the main shaft, the cam-shaft arranged at right angles to the main shaft, the intermediate gearing connecting the two shafts, the fence feeding and bundling devices or rolling devices, and means for operating said feeding and bundling devices from the cam-shaft, of the main drive-wheel, the short shaft, the pinion on one end of the short shaft meshing with the drive-wheel, and the pulley or wheel on the opposite end of the short shaft, substantially as specified.

2. In a fence-making machine, the combination, with the main shaft, the series of twisting-shafts, and devices, substantially as described, for connecting the twister-shafts together, of a clutch-pinion and clutch mounted upon one of the twister-shafts, and the gear-wheel 11, arranged upon the main shaft and meshing with the clutch-pinion, and clutch-lever $f$, cam on gear-wheel 11, and spring F, whereby the twister-shafts are operated during parts of the revolution of the main shaft, substantially as and for the purpose described.

3. The combination, with the main shaft and a twisting-shaft, of the gear-wheel mounted on the main shaft, the clutch-pinion arranged upon the twister-shaft and adapted to slide longitudinally thereon and meshing with the gear-wheel, the clutch keyed to the twister-shaft, and means, substantially as set forth, for moving the clutch-pinion to and from the fixed clutch, substantially as described.

4. The combination, with the main shaft, a twister-shaft, the clutch, the clutch-pinion, and the gear-wheel keyed upon the main shaft and meshing with the clutch-pinion, of the cam revolving with the gear-wheel, and the shipper-lever operated by the cam to move the clutch-pinion on the twister-shaft, as and for the purpose described.

5. The combination, with the main shaft, a twister-shaft, the gear-wheel mounted upon the main shaft, the clutch keyed to and the clutch-pinion mounted upon the twister-shaft and free to slide thereon to and from the clutch, of the shipper-lever, the cam revolving with the gear-wheel on the main shaft, and the spring acting in opposition to the cam, substantially as and for the purpose described.

6. The combination, with the main and twisting shafts and the mechanism connecting the two, whereby the twister-shafts are driven at intervals, of the time-needle keyed to one of the twister-shafts, the time-bar, and devices for projecting the time-bar within the path of the time-needle, substantially as and for the purpose described.

7. The combination, with the main shaft, a twister-shaft, mechanism connecting the two, whereby the twister-shafts are driven at intervals from the main shaft, and the time-needle keyed to the said twister-shaft, of the time-bar, a yielding bearing for the time-bar, and the cam for projecting the time-bar within the path of the time-needle, substantially as and for the purposes set forth.

8. The combination, with the main and twisting shafts, mechanism, substantially as described, for revolving the twister-shaft at intervals, and the time-needle keyed to the twister-shaft, of the time bar, the elbow or bell-crank bearing, the adjustable stop, and devices for projecting and retracting the time-bar, substantially as and for the purpose described.

9. The combination, with the twister-shaft, of the spool-supporting brackets clamped together and to the shaft, and the spools mounted between the branches of each bracket.

10. The combination, with the twister-shaft and the two spools journaled upon diametrically-opposite sides thereof, of the double tension-clamp bearing against each spool, substantially as and for the purposes specified.

11. The combination, with the spools having flanged ends, of the double tension-clamps bearing upon the flanges, substantially as and for the purpose specified.

12. In a fence-making machine, the combination, with the two presser-rollers, of the bell-crank levers 39, the springs V, the rods 39', and the levers 39², whereby the pressure on the rollers is regulated for pressing the wire upon the pickets, substantially as described.

13. The combination, with the twister-shaft and the two spools arranged on the shaft diametrically opposite each other, of the metal hub secured to the end of the shaft, the two-prong extensions 9', having openings 9² in their ends to allow of the passage of the wires, and the independent picket-holders 9, to receive the picket and prevent it binding the wire, which is arranged between the prong-extensions and the holders, substantially as shown.

14. The combination, with the picket-holders and the picket-ejector, of the arm $f^3$ and spring $f^2$, whereby the ejector is thrown forward, and the dog E, and the cam $d'$, substantially as described, for the purpose specified.

15. The combination, with the feeding-bar having fingers, the guides for the feeding-bar, and the lifting-bar, of mechanism, substantially as described, for operating the lifting-bar to elevate the guides for the feeding-bar and fingers, and means for advancing the feeding-bar in the guides, substantially as and for the purpose specified.

16. The combination, with the feeding-bar having fingers, the guide for the feeding-bar, the lifting-bar, and mechanism for operating the lifting-bar, of means, substantially as specified, for advancing the feeding-bar in the guide simultaneously with the rising of the said guide and the feeding of the fence.

17. The combination, with the feeding-bar and the guides at each end pivotally supported at one end, of the lifting-bar, the cam for tilting the lifting-bar, and the mechanism, substantially as described, for advancing the feeding-bar in the guides.

18. The combination, with the main shaft, the twisting-shaft, the gear-wheel keyed on the main shaft, the clutch-pinion, and the clutch, of the shipper-lever and the cam $f'$, revolving with the gear-wheel, and the extension $f^5$, for lengthening the cam, substantially as and for the purpose described.

19. The combination, with the cam shaft and the winding and feeding shafts, of the cam, the connecting-bar, and the two sets of pawls operated from the connecting-bar for actuating the winding and feeding shafts, substantially as set forth.

20. The combination, with the shaft 51, the wheels 31, and the roller 27, of the bars 30 and 41, adjustably connected together, substantially as set forth.

ANDREW JACKSON NEAL.

Witnesses:
H. J. DAVIS,
F. M. SLADE.